United States Patent [19]

Webb et al.

[11] Patent Number: 5,178,509

[45] Date of Patent: Jan. 12, 1993

[54] EQUALIZED MODULE MOVER WITH SELF ADJUSTING TRACK UNITS

[75] Inventors: Larry D. Webb, Lockney; Henry W. Hurt, Lubbock, both of Tex.

[73] Assignee: Module Truck Service, Inc., Lubbock, Tex.

[21] Appl. No.: 521,110

[22] Filed: May 2, 1990

[51] Int. Cl.⁵ .............................................. B60P 1/38
[52] U.S. Cl. ................................... 414/491; 414/483; 414/528; 414/786; 280/6.11; 180/249
[58] Field of Search ............... 414/474, 476, 480, 482, 414/483, 491, 527, 528, 786; 280/6.11, 714; 180/9.42, 9.54, 249

[56] References Cited

U.S. PATENT DOCUMENTS

| | | | |
|---|---|---|---|
| 2,788,908 | 4/1957 | Lyrd | 414/476 |
| 2,955,843 | 10/1960 | Chuba | 280/714 X |
| 3,037,788 | 6/1962 | Haddad | 280/714 X |
| 3,298,550 | 1/1967 | Schlitz | 414/491 |
| 4,030,777 | 6/1977 | Rabenseiffner | 280/714 |
| 4,046,209 | 9/1977 | LaCasse | 280/6.11 X |
| 4,081,094 | 3/1978 | Pereira et al. | 414/491 X |
| 4,222,578 | 9/1980 | Meisel, Jr. | 280/714 X |
| 4,238,128 | 12/1980 | McKee | 280/714 X |
| 4,243,353 | 1/1981 | Reed | 414/491 X |
| 4,249,850 | 2/1981 | Van Doorn et al. | 414/491 |
| 4,417,841 | 11/1983 | Chadwick | 414/491 X |
| 4,700,797 | 10/1987 | Leibeo | 180/249 X |
| 4,848,506 | 7/1989 | Shimada et al. | 180/249 X |
| 4,938,306 | 7/1990 | Sumiyoshi et al. | 180/249 X |
| 5,108,250 | 4/1992 | Fewin, Jr. et al. | 414/491 X |

Primary Examiner—Michael S. Huppert
Assistant Examiner—James Keenan
Attorney, Agent, or Firm—Coffee - Novak

[57] ABSTRACT

Apparatus and method for increasing the ability of a cotton module mover to reach remote locations in soil conditions which typically hinder travel; to load and unload modules on soft, uneven, and wet ground; and, to equalize the horizontal movement of the ground engaging portions of the tires, the track units, and to drive the live floor of the mover's bed at the same horizontal rate as the mover's actual movement with respect to the ground. The invention includes self-adjusting supports which distribute a portion of the weight of the mover equally to each of the track units and allows each track unit to independently extend to various positions below the mover. The equalization of the horizontal movement of the tires, the track units, and the live floor includes mechanically interconnecting the tires and track units and controlling the live floor with a system which detects the mover's actual movement relative to the ground and then drives the live floor at that speed.

12 Claims, 4 Drawing Sheets

EQUALIZED MODULE MOVER WITH SELF ADJUSTING TRACK UNITS

RIGHTS TO INVENTIONS UNDER FEDERAL RESEARCH

There was no federally sponsored research and development concerning this invention.

BACKGROUND OF THE INVENTION (1) Field of the Invention

This invention relates to module movers which are well known pieces of equipment used in the cotton industry. Those with ordinary skill in the art are designers and makers of cotton module movers.

(2) Description of the Related Art

The module mover is used to load, transport, and unload cotton modules. These modules are compressed parallelepipedon masses of harvested cotton with dimensions in excess of seven feet by seven feet by thirty-five feet.

As cotton is harvested, it is compressed by a module builder into these modules which are deposited on the ground when compaction is completed. The modules are compacted to a density which allows them to be free standing and self-supporting. That is to say, when they are left in the field after being compacted, the modules retain their shape until being retrieved by a module mover.

The module mover has a tilting cargo bed with dimensions sufficient to accommodate the compressed module. To retrieve modules, the mover is driven into a field to the location where a module has been deposited by the module builder. Upon arriving at the location of the module, the bed of the mover is tilted, typically by hydraulic means, so that the back of the bed is at ground level. The back of the bed is then positioned against the base of the module at one of the module's ends. The tilted configuration is referred to as the loading and unloading position; hereinafter, loading position and unloading position will be used interchangeably.

The loading of the module is facilitated by the use of a live floor in the bed of the mover. The live floor typically consists of a series of chains that run the length of the bed and support the weight of the cotton module.

Loading the module is accomplished by backing the module mover under the module. As the mover progresses backward and under the module, that portion of the module which is loaded and above the mover is supported upon the live floor in the bed of the mover. When the module is completely loaded and totally supported upon the bed of the mover, the bed is then tilted back into the horizontal transporting position.

The module movers presently used in the cotton industry are supported upon tires, track units, and steel wheels during loading and unloading. Tires are located near the middle of the cargo bed's length and support most of the weight of the mover when it is transporting the modules with the cargo bed in the horizontal position. The tires also support a portion of the weight of the module mover when it is loading and unloading a module. The track units are located near the back of the bed and contact the ground and support the mover only when the bed is in the loading position. The steel wheels are attached to the bed frame behind the track units; and like the track units, the steel wheels support a portion of the weight of the mover during loading and unloading. In addition to being weight bearing supports, the steel wheels keep the back of the tilted bed positioned at the base of the module during loading and unloading. It is important that the leading edge of the back of the bed remain at or very near the interface between the cotton module and the ground on which the module is resting during loading and unloading.

The typical design of the mover permanently positions the track units so that the flat track-to-ground engaging portion of the track units is on a line which is tangent to the back steel wheels and the transporting tires. This line should be nearly horizontal when the bed is in the tilted position. The tires, track units, and wheels are designed to all contact the ground when the bed is in the tilted position.

The problem with this design is that the ground upon which loading and unloading takes place rarely provides a flat horizontal surface for the tires, track units, and wheels to engage. Since these three structures are rigidly fixed relative to the bed of the mover, they do not adjust to accommodate variations in the ground's surface. As a result, contact is made only with the high point, or points, along the line tangent to the bottom of the three structures.

The drawbacks encountered because the components are rigidly fixed to the mover are accentuated by the unevenness of the ground on which loading and unloading typically takes place. The ground is also often soft and muddy due to low compaction and high moisture content. The result is that traction is difficult to achieve between the driving components (the driving components are the track units; the tires are not used to drive the mover during loading and unloading, they merely roll as the track units pull the mover across the ground) and the ground because there is less than complete contact between the bottoms of the track units and the ground. Additionally, there is rarely an even distribution of the weight of the mover to the several supporting structures because the ground is softer under certain areas of the mover and offers differing degrees of resistance to the downward force of the weight of the mover. When the track units are above soft or muddy areas while the tires and wheels are on solid ground, the mover is not able to achieve the required traction to propel the mover along the ground and load a module.

One recent embodiment of the module mover includes track units which have been modified so that they are not rigidly fixed to the bottom of the mover. The track units are instead connected to the mover by movable legs which allow vertical extension of the track units below the mover. The movement is accomplished by placing a resilient air bag between the track units and the mover and applying equal air pressure to the bag. This allows the track units to extend independently and permits an even distribution of the mover's weight to each track unit as long as sufficient resistance from the soil is encountered before the bag reaches maximum expansion. The extension of the legs which these air bags are able to produce is limited and they do not have the ability to retract the track units up near the bottom of the mover when the track units are not needed.

Another disadvantage of the above described mover is that the track units and live floor are driven by a common hydraulic motor. The result is that during loading or unloading the track units may experience slippage so that the mover has not traveled a horizontal distance, with respect to the ground, equal to the horizontal movement of the track-to-ground engaging portion of the track units. Because the track units and the live floor are driven by the same motor, the floor will continue to move with a horizontal component equal to the horizontal movement of the track-to-ground engaging portion of the track unit, not the actual horizontal movement of the mover. This may result in the pulling apart of the module because the mover is not moving under the module at a sufficient rate to accommodate the rate at which the live floor is attempting to load the module.

SUMMARY OF THE INVENTION

(1) Progressive Contribution to the Art

This invention increases the ability of a cotton module mover to reach remote locations in soil conditions which typically hinder travel; this invention increases the mover's ability to load and unload modules on soft, uneven, and wet ground; and, this invention equalizes the horizontal movement of the tire-to-ground engaging portion of the tires, the track-to-ground engaging portions of the track units; and this invention drives the live floor of the mover's cargo bed at the same horizontal rate as the mover's actual movement with respect to the ground.

This invention adds to the above described related art support systems for track units that are capable of vertical extension and make it possible for the track units to tilt during operation so that maximum track-to-ground contact is achieved. The increased track-to-ground contact is accomplished by attaching the track unit to the mover so that the front and back of each track unit move up and down independently. In this way the track unit is allowed to adjust itself to the topography of the terrain over which it is traveling. This self-adjusting feature assures that the maximum possible area of the track unit's bottom surface is firmly against the soil. This increase in track-to-ground engaging area enhances the traction of the track as well as increases the area over which the weight of the mover is distributed. This is an important benefit since by distributing the weight of the mover over a greater ground area, the ground engaging components are less likely to bury down into the soil causing the mover to become stuck.

The increased extension range of the track units below the mover is accomplished by using fluid pressure support units, each of which have a cylinder with a reciprocating piston. The support units provide a separating force between the track units and the bed frame. That is to say, air pressure is supplied to the support unit which tends to push the piston from within the cylinder. The result is that as the pressure increases, the two components are driven in opposing directions. With the outside end of the cylinder journalled to the bed frame and the outside end of the piston journalled to the track unit, the support unit provides a separating force between the track unit and the bed frame.

As pressure is applied to the support unit, the piston extends and the support unit elongates until either an equilibrium is reached between the driving air pressure and the resistance encountered by the track unit from the ground below, or a maximum extension is reached and further extension is mechanically prevented. In this embodiment, pressure is supplied from a common air source which is fluidly connected to each cylinder. By having the several support units fluidly connected, it is assured that an equal downward pressure is exerted on each track.

The ability to extend the track units is likewise beneficial when the mover must travel over rough soil to get to the modules it is designed to retrieve. In the soft and muddy ground conditions sometimes encountered while traversing cotton fields, the mover's tires often sink into the soil becoming bogged down and causing the mover to become stuck. The sinking of the tires results from the inability of the soil to support the weight of the mover on the limited surface area provided by the ground engaging portion of the tires alone. This invention makes it possible to extend the track units so that the area upon which the mover's weight is being borne is increased sufficiently to support the mover so that it can traverse the soft area and continue its journey. Without the extendable track units, assistance would normally have been required to free the mover.

The ability of the track units to adjust automatically and thereby distribute a portion of the weight of the mover evenly to each track unit is particularly beneficial during the loading and unloading of a module. After the bed of the mover is tilted so that it is ready to either load or unload a module, the track units are extended vertically down towards the ground until contact is made. The air pressure supplied to each track unit is increased until the track units are pressed against the ground with sufficient force to provide adequate traction to accomplish the loading task. Operating the track units independently off of the same air source overcomes two hindrances presented by the above described soil characteristics. The first hindering characteristic is that there is rarely the same distance between each track unit and the ground over which the mover stops to begin the loading or unloading process. But since the support units operate independently, each track unit extends to whatever position is required to achieve effective contact with the ground beneath it. Additionally, the track unit will tilt upon reaching the ground to maximize the track-to-ground contact as described above.

The second hindering characteristic of the soil which is overcome by this invention is that the ground beneath each track may not be able to bear the same load per a given area due to different degrees of compaction, water content, and the like. Because this invention supplies the same downward pressure to each track, the extension of either track will continue until the resistance offered by the ground below that particular track unit equals the downward force created by the air pressure. This equalization will almost always require that the track units be at different degrees of extension.

As the track units travel over soil of differing characteristics, the self-adjusting supports will continually compensate because the supports extend and retract under the static air pressure supplied to those supports.

The support units are also able to retract the track units up near the bottom of the mover. The primary benefit of this feature is that the track units are up out of the way when they are not needed. Additionally, there is less risk that the track will strike damaging objects when the mover is in the transporting position and travelling over rough terrain.

This invention further enhances the performance of the module mover by powering the tires during loading and unloading to assist the track units which previously served as the only driving mechanism during module loading and unloading. Additionally, the tires and track units are physically interconnected and the horizontal movement of their ground engaging portions are equalized. The obvious advantage of adding the tires as driving mechanisms is that the surface area from which the mover derives traction for pushing and pulling itself under the module during loading and unloading is increased. This naturally increases the ability of the mover to perform in unfavorable soil conditions which require more ground engagement to produce the required traction.

By physically interconnecting the tires and track units during the loading and unloading processes, it is possible for the same power source to be used to drive the tires and the track units. Additionally, if one of the track units or tires experiences slippage, it will not effect the operation of any of the other tires or track units. The non-slipping tires and track units will continue in the desired direction.

(2) Objects of this Invention

An object of this invention is to move cotton modules. Other objects of this invention are to increase the ability of a cotton module mover to reach remote locations in soil conditions which typically hinder travel; to increase the mover's ability to load and unload modules on soft, uneven, and wet ground; and to equalize the horizontal movement of the tire-to-ground engaging portion of the tires and the track-to-ground engaging portions of the track units.

Further objects are to achieve the above with devices that are sturdy, compact, durable, simple, safe, efficient, versatile, ecologically compatible, energy conserving, and reliable, yet inexpensive and easy to manufacture, operate, and maintain.

Other objects are to achieve the above with a method that is rapid, versatile, ecologically compatible, energy conserving, efficient, and inexpensive, and does not require highly skilled people to install, operate, and maintain.

The specific nature of the invention, as well as other objects, uses, and advantages thereof, will clearly appear from the following description and from the accompanying drawings, the different views of which are not necessarily scale drawings.

Figure 1:
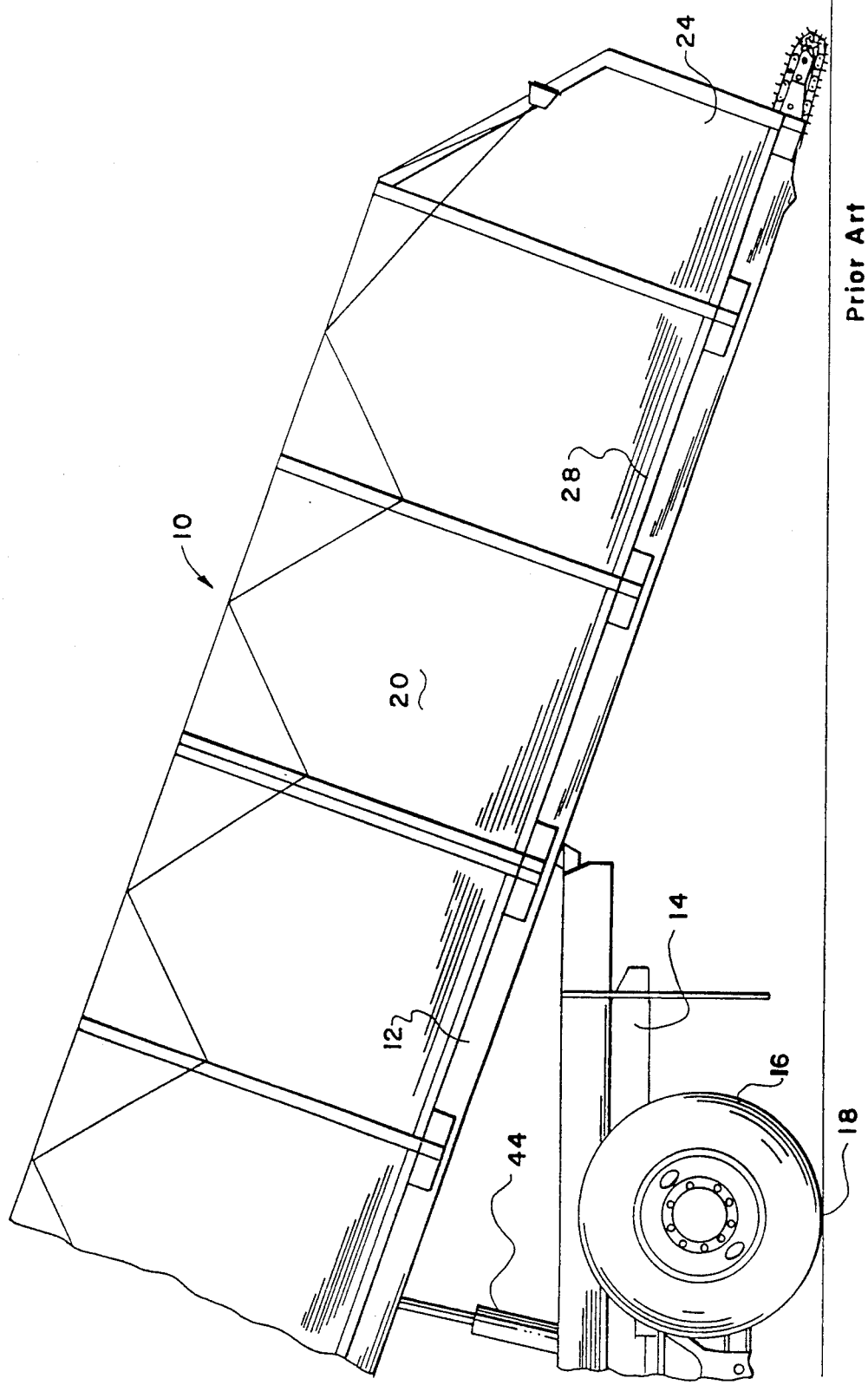
FIG. 1 is a perspective view of a portion of a module mover which is in a tilted loading position and is without track units.

As an aid to correlating the terms of the claims to the exemplary drawings, the following catalog of elements and steps is provided:

10 cotton module mover
12 bed frame
14 chassis frame
16 tires
18 tire-to-ground engaging portion
20 cargo bed
22 bed front end
24 bed back end
26 metal wheels
28 live floor
30 track units
32 track front end
34 track back end
36 metal track
37 metal plates
38 track-to-ground engaging portion
40 return portion
42 support units
44 hydraulic tilting mechanism
46 cylinder
48 reciprocating rod
50 common air source
52 positive drive transmission
54 connecting arms
56 connecting pieces
58 radar monitor
60 universal joint connection
62 gear box
64 drive shaft

DESCRIPTION OF THE PREFERRED EMBODIMENTS(S)

In the attached drawings portions of the back of a cotton module mover 10 may be seen. Many components of the cotton module mover are attached to bed frame 12. Below the bed frame 12 is a chassis frame 14. Below and attached to the chassis frame 14 are tires 16. The tires 16 are laterally positioned below the chassis frame 14 and are connected to the chassis frame 14 so that the tires 16 rotate about this point of connection. On the tire 16 is tire-to-ground engaging portion 18 which is the part of the tire that is in actual contact with the ground as the tire 16 rolls along the ground's surface. The chassis frame 14 serves as the support structure between the bed frame 12 and the tires 16. Upon the top of the bed frame 12 is cargo bed 20 which has a bed front end 22 and a bed back end 24. The cargo bed 20 runs the length of the bed frame 12 and serves as the support surface for cargo being transported.

When the cotton module mover 10 is loaded and transporting a cotton module, the bed frame 12 and the cargo bed 20 are in a horizontal position. When in this horizontal transporting position, the tires 16 support the majority of the weight of the loaded cotton module mover 10.

Near the bed back end 24 and below the bed frame 12 are metal wheels 26. There are two metal wheels 26 on each mover 10 and each of the two wheels is laterally positioned and attached to the bottom of bed frame 12 by a connection point about which the wheels rotate. Within the cargo bed 20 is live floor 28 which includes a series of parallel chains each of which runs the length of the cargo bed 20. The chains are connected so that they form a belt which is rotatable about the cargo bed 20. By having the ability to rotate about the cargo bed 20, the live floor 28 is able to move along the length of the cargo bed 20 in a plane parallel to the cargo bed 20.

Also below the bed frame 12 are track units 30. There are two track units 30 on each mover 10 and each track unit 30 is laterally positioned beneath this bed frame 12. The track units 30 have a track front end 32 and a track back end 34. The track units 30 are connected to the bed frame 12 and oriented so that the track front ends 32 are positioned toward the bed front end 22 and the track back ends 34 are positioned toward the bed back end 24. Metal track 36 is comprised of a series of metal plates 37 which are interconnected so that the metal plates 37 form a belt type structure which is rotatable about a portion of the track unit 30. The part of the metal track 36 which is flat and designed to contact the ground makes up the track-to-ground engaging portion 38. The remaining part of metal track 36 which is not designed to be in contact with the ground is return portion 40 of the metal track 36.

When the module mover 10 is transporting a module, the bed frame 12 is in the horizontal transporting position. When in the tilted loading or unloading position, the bed frame 12 is tilted from the horizontal position so that the bed front end 22 is higher than the bed back end 24 and the bed back end 24 is positioned near the ground. When in this tilted position, the tires 16, the track units 30, and the metal wheel 26 are all designed to contact the ground's surface. In the loading position, a line tangent to the metal wheels 26 and the tires 16 would be parallel to and along a smooth ground surface.

The tilting of the bed frame 12 is accomplished by hydraulic tilting mechanism 44. The hydraulic tilting mechanism 44 raises the bed front end 22 and thereby pivots the bed frame 12 about the point at which bed frame 12 is connected to chassis frame 14. When in the tilted position, the track units 30 are extended so that the track-to-ground engaging portion 38 is also contacting the ground's surface.

Those with ordinary skill in the art will recognize that the structure described to this point is old and well known in the art.

Serving as the connecting structure between the bed frame 12 and each track unit 30 is support unit 42. There are two support units 42 for each track unit 30 with each support unit 42 positioned on one lateral side of the track unit 30. The support unit 42 includes a cylinder 46 and a reciprocating rod 48. The track unit 30 additionally includes two connecting arms 54 and two connecting pieces 56; each laterally positioned on the track unit 30. The cylinder 46 and the reciprocating rod 48 together act as an extending and retracting mechanism for the track unit 30. Common air source 50 is fluidly connected to each of the support units 42. Equal fluid pressure is supplied to each support unit 42 from a common fluid pressure source. In the embodiment shown, the fluid is air supplied from common air source 50.

The air source 50 is connected to each cylinder 46 at two inlet locations by a fluid connection. Air from the common source 50 is routed to a valve that directs the air to either of the two inlet locations. Once an inlet is selected, the fluid connections between the source 50 and each cylinder 46 of the support units 42 remain open so that like air pressure is provided to each of said cylinders and free fluid communication is allowed between the cylinders 46 and the common fluid source.

Depending upon to which of the two inlets air pressure is supplied, the support unit 42 acts as an extending or retracting means. The support unit 42 acts as an extending means if air pressure forces the rod 48 from within the cylinder 46 and a retracting means if air pressure forces the rod 48 into the cylinder 46. The end of the cylinder 46 which is opposite the end of the cylinder 46 within which rod 48 reciprocates is journalled to the bed frame 12 so that pivoting about this connection point is possible. Likewise, the end of the rod 48 which is away from the cylinder 46 is journalled to the connecting piece 56 so that pivoting about this point of connection is also possible.

Each of the connecting arms 54 are journalled at one end to the bed frame 12 and to the track unit 30 at the other. Each of the connecting pieces 56 are also journalled to the bed frame 12 at one end and to the track unit 30 near the connecting piece's 56 midpoint. Beyond the point at which the connecting piece 56 is journalled to the track unit, the rod 48 is also journalled to the connecting piece 56.

The support units 42, including the connecting pieces 56, and the connecting arms 54, operate during the extension and retraction of the track unit 30. The configuration by which these components (the connecting arms 54, the connecting pieces 56, cylinders 46, and the reciprocating rods 48) are interconnected between the track unit 30 and the bed frame 12 makes it possible for the track unit to be extended at varying distances below the bed frame 12 in addition to making it possible for the metal track 36, and more particularly the track-to-ground engaging portion 38 to tilt thereby maximizing the contact between the ground engaging portion 38 and the ground's surface. Because of the ability of the track unit 30 to tilt and thereby maximize the contact area between the track-to-ground engaging portion 38 and the ground surface, maximum possible traction is achieved.

When the track units are appropriately extended and the track-to-ground engaging portion 38 is contacting the ground, the module mover 10 is designed so that the tires 16, the track units 30, and the metal wheels 26 are all in contact with the ground's surface and supporting a portion of the module mover's 10 weight. The positioning of the metal wheels 26 is designed to assure that the bed back end 24 of the cargo bed 20 is at or just above the ground's surface in the tilted position.

Figure 2:
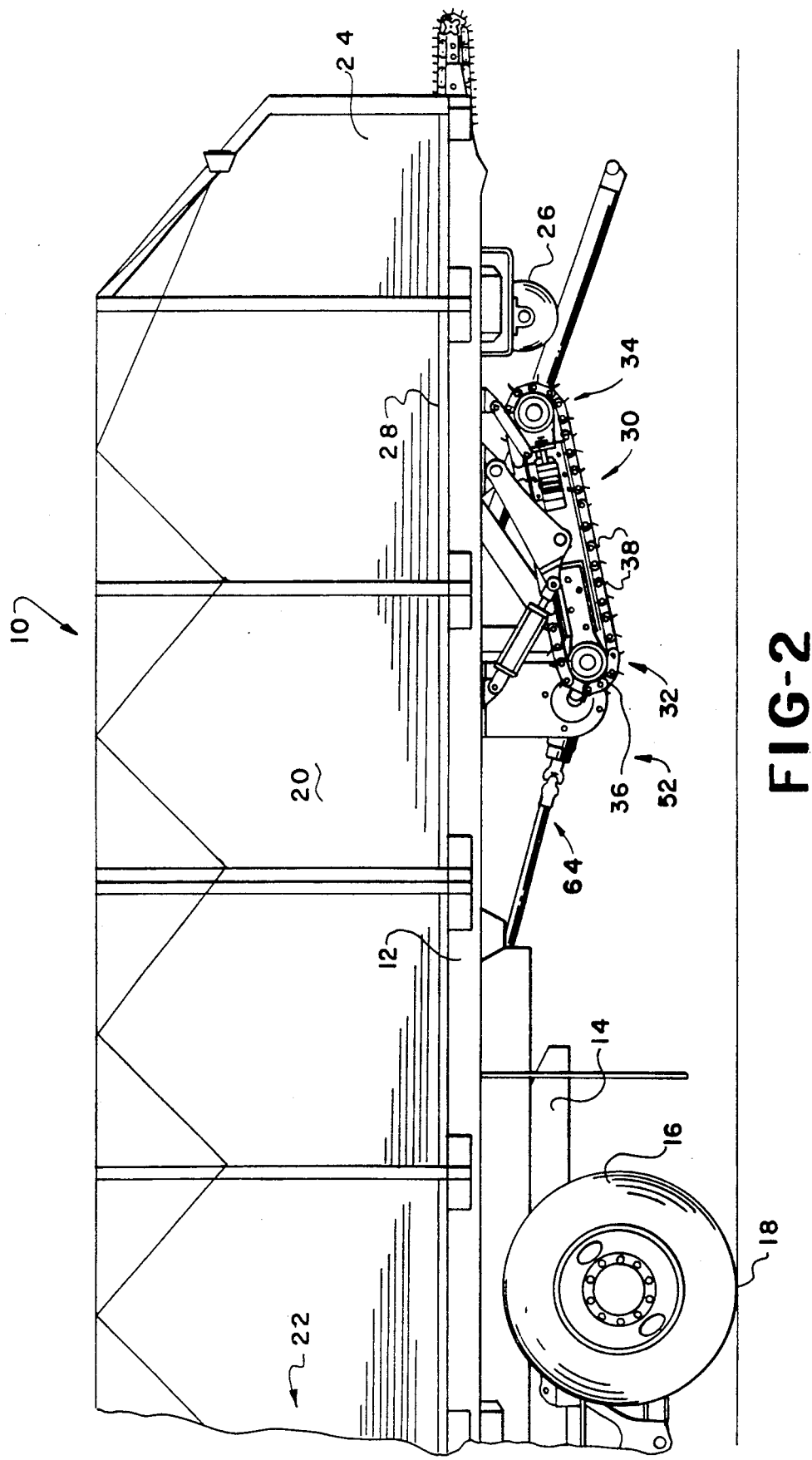
FIG. 2 is a perspective view of a portion of a module mover which is in a horizontal transporting position with track units shown in a retracted position.
Figure 3:
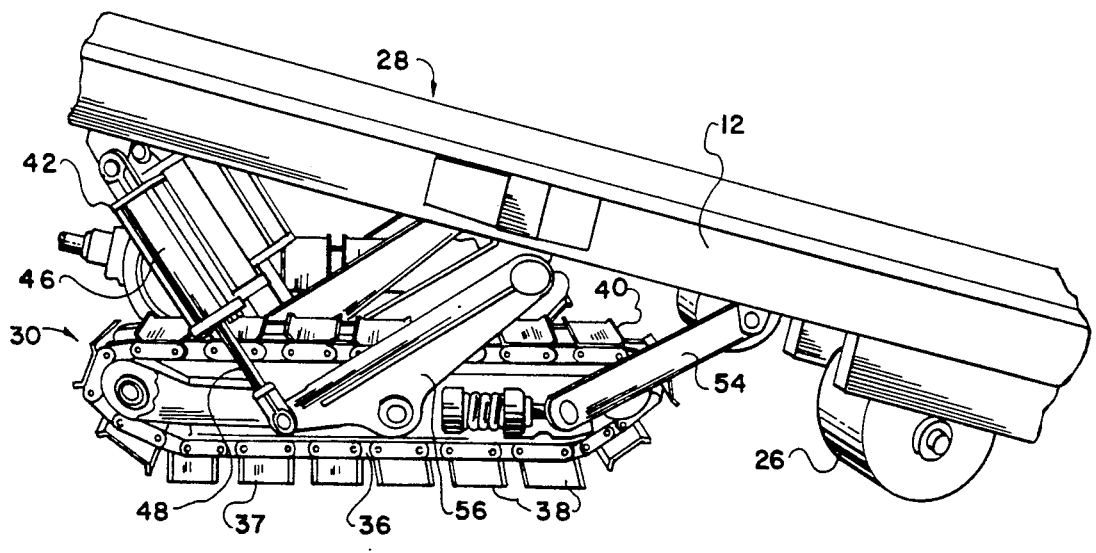
FIG. 3 is a detailed perspective view of a lateral side of a track unit.
Figure 4:
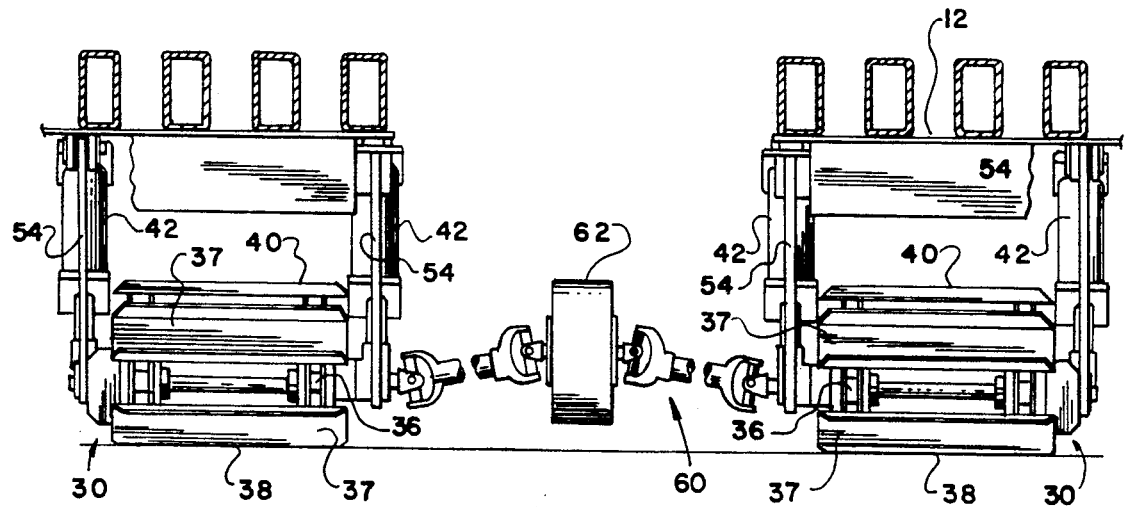
FIG. 4 is a detailed perspective view of a back end of a track unit.

When the module mover 10 is tilted into the loading position, both the tires 16 and the track units 30 serve as the driving mechanisms which propel the mover 10 along the ground's surface. To assure that the horizontal movement of the track-to-ground engaging portion 38 of the track unit 30 and the tire-to-ground engaging portion 18 of the tires 16 are equalized, a common driving mechanism for both components is interconnected through a positive drive transmission 52. The transmission 52 is designed and connected so that the horizontal movement in the ground engaging portions 38 and 18 are equal regardless of slippage and the amount of resistance that each individual component experiences because of its contact with the ground. Positive drive transmission 52 comprises a driving mechanism for both the tires 16 and the track units 30. As seen in FIGS. 2, 3, and 4, the transmission 52 includes at least one drive shaft 64 that together with universal joints and at least one gear box connects the driving mechanism of the tires 16 to the driving mechanism of the track units 30. The drive shaft 64 powers a gear box 62 that transfers the rotation of said shaft 64 to the track units through universal joint connections 60.

Figure 5:
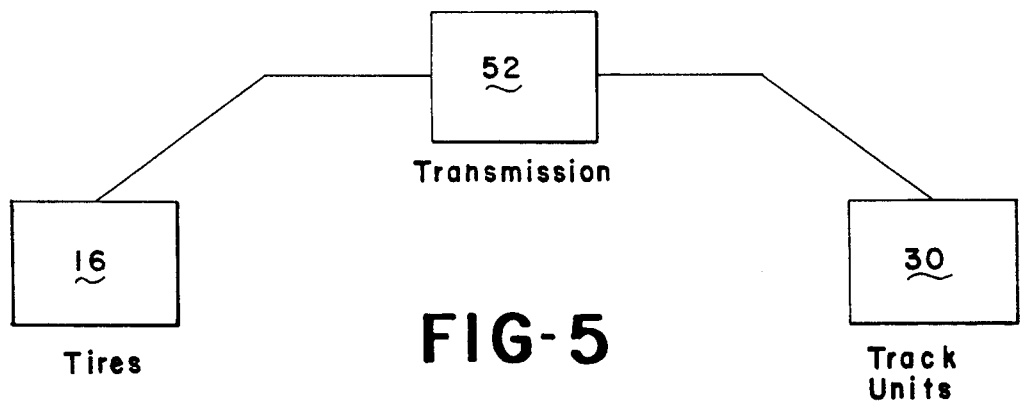
FIG. 5 is a schematic drawing of the interconnection of the module mover's tires and track units.
Figure 6:
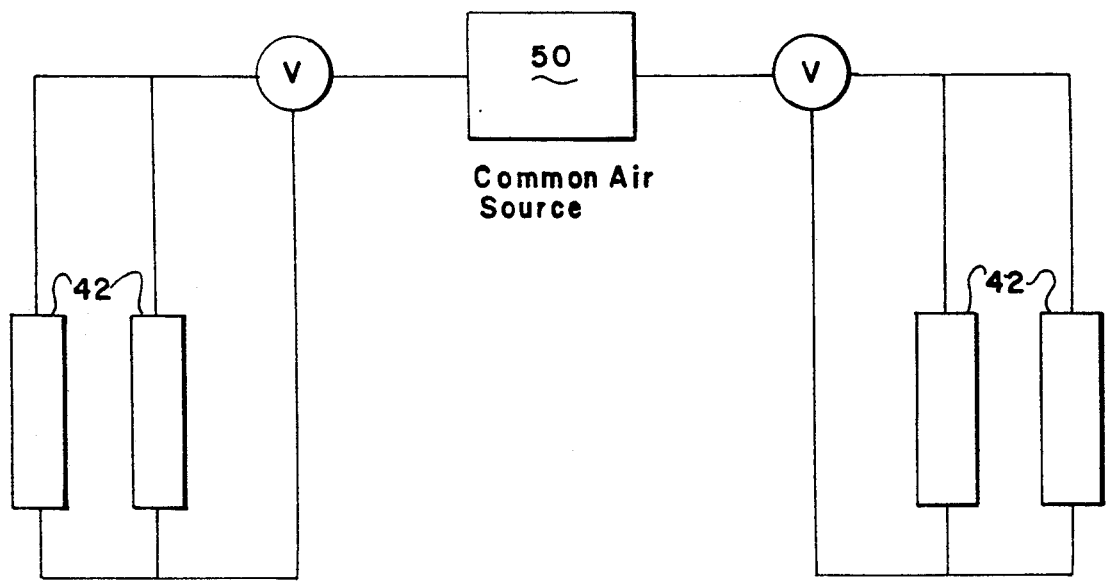
FIG. 6 is a schematic drawing of the fluid connection of a common air source to four support units.

Referring to FIG. 4, the gear box 62 to which the drive shaft 64 interconnects is shown. The universal joint connection 60 connects between the gear box 62 and the track units 30 thereby driving said track units 30. The transmission 52 is connected to the tires 16 in a typical manner for over-land vehicles. By having the tires 16 and track units 30 linked together by the positive drive transmission 52, the horizontal movement of the tire-to-ground engaging portion of the tires 16 and the track-to-ground engaging portion of the track units 30 is synchronized. The transmission 52 accomplishes synchronization through gears and other conventional connections that change torques and speeds of rotation. The connection between the tires 16 and the track units 30 is shown schematically in FIG. 5.

The embodiment shown and described above is only exemplary. I do not claim to have invented all the parts, elements or steps described. Various modifications can be made in the construction, material, arrangement, and operation, and still be within the scope of my invention.

The restrictive description and drawings of the specific examples above do not point out what an infringement of this patent would be, but are to enable one skilled in the art to make and use the invention. The limits of the invention and the bounds of the patent protection are measured by and defined in the following claims.

I claim as my invention:

1. A process for equalizing the horizontal movement of a tire-to-ground engaging portion of tires and a track-to-ground engaging portion of track units on a cotton module mover during loading:
   said module mover having:
   a. a bed frame pivoted to
   b. a chassis frame,
   c. tires on the chassis frame which support a portion of the weight of the mover,
   d. a cargo bed on the bed frame,
   e. said cargo bed having a bed front end and a bed back end,
   f. said cargo bed tilts from a horizontal transporting position into a tilted loading position,
   g. tilting means for tilting the bed frame into a loading and unloading position from a horizontal transporting position,
   h. a live floor in the cargo bed which moves along the length of said cargo bed,
   i. track units on the bed frame which support a portion of the weight of the mover,
   j. said track units having a track front end and a track back end,
   k. each track unit having a metal track comprised of interconnected metal plates that form a belt type structure rotatable about a portion of the track unit,
   l. said track units having:
      1. a track-to-ground engaging portion, and
      2. a return portion, and
   m. said tires rotate about a point at which they are connected to the chassis bed and have a tire-to-ground engaging portion,
   wherein the improved method for equalizing the horizontal movement of the tire-to-ground engaging portion of the tires and the track-to-ground engaging portions of the track units comprises:
   n. constructing a positive drive mechanical transmission which produces the same horizontal movement in the tire-to-ground engaging portion of the tires and the track-to-ground engaging portion of the track units, and
   o. interconnecting the tires and track units, by mechanically connecting the positive drive transmission between the wheels and track units.

2. In a cotton module mover having:
   a. a bed frame pivoted to
   b. a chassis frame,
   c. tires on the chassis frame which support a portion of the weight of the mover,
   d. a cargo bed on the bed frame,
   e. said cargo bed having a bed front end and a bed back end,
   f. said cargo bed tilts from a horizontal transporting position into a tilted loading position,
   g. tilting means for tilting the bed frame into a loading and unloading position from a horizontal transporting position,
   h. a live floor in the cargo bed which moves along the length of said cargo bed,
   i. track units on the bed frame which support a portion of the weight of the mover,
   j. said track units having a track front end and a track back end,
   k. each track unit having a metal track comprised of interconnected metal plates that form a belt type structure rotatable about a portion of the track unit,
   l. said track units having:
      1. a track-to-ground engaging portion, and
      2. a return portion, and
   m. said tires rotate about a point at which they are connected to the chassis bed and have a tire-to-ground engaging portion,
   wherein the improvement comprises the following structure:
   n. support units, one each between each track unit and the bed frame, which exert an equal force between the bed frame and each track unit using fluid pressure,
   o. each support unit connected to a common fluid pressure source by
   p. a fluid connection with
   q. valves placed within the fluid connection so that there is one valve each between the common pressure source and each support unit,
   r. said valves being used to select between retraction and extension of the support units, and
   s. said fluid connection provides free fluid communication between each of the support units and the common pressure source once the valves have been positioned to select between retraction and extension of each support unit,
   t. each support unit comprising:
      i. at least one cylinder,
      ii. a reciprocating rod within each cylinder,
      iii. at least two inlets into each cylinder,
      iv. one inlet is in free fluid communication with the common pressure source when fluid pressure is directed to said inlet by one of the valves, and
      v. another of the inlets is in free fluid communication with the common pressure source when fluid pressure is directed to said inlet by the same valve,
   u. each track unit comprising:
      i. two connecting arms, one each journalled between each outer lateral side of each track unit and the bed frame,
      ii. said connecting arms are journalled to the track units at points near the track back end,
      iii. two connecting pieces, one each journalled between each outer lateral side of each track unit and the bed frame,
      iv. said connecting pieces are journalled to the track units at a point between the track front end and the point at which the connecting arm is journalled to the track unit, v. two rods, one each journalled to the connecting pieces beyond the point at which the connecting pieces are journalled to the track unit, and vi. two cylinders each journalled to the bed frame.

3. A cotton module mover having:
a. a bed frame pivoted to
b. a chassis frame,
c. tires on the chassis frame which support a portion of the weight of the mover,
d. a cargo bed on the bed frame,
e. said cargo bed having a bed front end and a bed back end,
f. said cargo bed tilts from a horizontal transporting position into a tilted loading position,
g. tilting means for tilting the bed frame into a loading and unloading position from a horizontal transporting position,
h. a live floor in the cargo bed which moves along the length of said cargo bed,
i. track units on the bed frame which support a portion of the weight of the mover,
j. said track units having a track front end and a track back end,
k. each track unit having a metal track comprised of interconnected metal plates that form a belt type structure rotatable about a portion of the track unit,
l. said track units having:
  1. a track-to-ground engaging portion, and
  2. a return portion, and
m. said tires rotate about a point at which they are connected to the chassis bed and have a tire-to-ground engaging portion, wherein the improvement comprises:

n. equalization means for equalizing the horizontal movement of the track-to-ground engaging portion of the track units and the tire-to-ground engaging portions of the tires,
o. said equalization means comprises a positive drive transmission that mechanically interconnects the tires and track units and is constructed to produce the same horizontal movement in the tire-to-ground engaging portion of the tires and the track-to-ground engaging portion of the track units.

4. A process for more evenly distributing the weight of a cotton module mover during loading:
said module mover having:
a. a bed frame pivoted to
b. a chassis frame,
c. tires on the chassis frame which support a portion of the weight of the mover,
d. a cargo bed on the bed frame,
e. said cargo bed having a bed front end and a bed back end,
f. said cargo bed tilts from a horizontal transporting position into a tilted loading position,
g. tilting means for tilting the bed frame into a loading and unloading position from a horizontal transporting position,
h. a live floor in the cargo bed which moves along the length of said cargo bed,
i. track units on the bed frame which support a portion of the weight of the mover,
j. said track units having a track front end and a track back end,
k. each track unit having a metal track comprised of interconnected metal plates that form a belt type structure rotatable about a portion of the track unit,
l. said track units having:
  1. a track-to-ground engaging portion, and
  2. a return portion, and
m. said tires rotate about a point at which they are connected to the chassis bed and have a tire-to-ground engaging portion, wherein the improved method for distributing the weight of the mover to the track units comprises:

n. supporting the bed frame above the track units by support units which
o. apportion part of the weight of the bed equally to each track unit by
p. placing fluid pressure support units, one each of said support units between each track unit and the bed frame,
q. supplying equal fluid pressure to each support unit by
r. connecting each support unit to a common fluid pressure source by a fluid connection that allows free fluid communication between the fluid pressure source and each support unit, and
s. positioning fluid inlets on each of the support units so that when pressure is applied to one of the inlets on each of the support units, said support units elongate and the track units are forced away from the cargo bed and when pressure is applied to another of the inlets on each of the support units said support units retract thereby drawing the track units close to the bed and off the ground.

5. The invention as defined in claim 4 further comprising:
t. placing valves within the fluid connection, one each of said valves between the common fluid source and each support unit,
u. utilizing each valve to determine to which inlet fluid pressure will be supplied, and thereby
v. selecting between extension and retraction of the support unit.

6. The invention as defined in claim 5 further comprising:
w. constructing the support units so that each support unit includes at least one reciprocating rod within a cylinder.

7. The invention as defined in claim 6 further comprising:
x. positioning the valve to select extension of the support units,
y. increasing the supplied fluid pressure to the support units as the weight of the mover increases during loading, and thereby
z. maintaining proper vertical positioning of the mover during loading and unloading.

8. The invention as defined in claim 7 further comprising:
aa. allowing each support unit to operate independently by
bb. extending each support unit to a position that equalizes the downward force supplied by the air pressure and the resulting upward force created by the ground's resistance against the track unit to the extension of the support unit, and thereby
cc. making it possible for the support units to be at varying degress of extension.

9. The invention as defined in claim 6 further comprising:
x. positioning the valve to select retraction of the support units,
y. increasing the supplied fluid pressure to the support units and thereby z. retracting the track units up near the bottom of the bed frame when the module mover is in the transporting position, and thereby aa. preventing the tracks from being damaged by objects over which the mover is traveling.

10. In a cotton module mover having:
    a. a bed frame pivoted to
    b. a chassis frame,
    c. tires on the chassis frame which support a portion of the weight of the mover,
    d. a cargo bed on the bed frame,
    e. said cargo bed having a bed front end and a bed back end,
    f. said cargo bed tilts from a horizontal transporting position into a tilted loading position,
    g. tilting means for tilting the bed frame into a loading and unloading position from a horizontal transporting position,
    h. a live floor in the cargo bed which moves along the length of said cargo bed,
    i. track units on the bed frame which support a portion of the weight of the mover,
    j. said track units having a track front end and a track back end,
    k. each track unit having a metal track comprised of interconnected metal plates that form a belt type structure rotatable about a portion of the track unit,
    l. said track units having:
        1. a track-to-ground engaging portion, and
        2. a return portion, and
    m. said tires rotate about a point at which they are connected to the chassis bed and have a tire-to-ground engaging portion, wherein the improvement comprises the following structure:

n. support units, one each between each track unit and the bed frame, which exert an equal force between the bed frame and each track unit using fluid pressure,
    o. each support unit connected to a common fluid pressure source by
    p. a fluid connection with
    q. valves placed within the fluid connection so that there is one valve each between the common pressure source and each support unit,
    r. said valves being used to select between retraction and extension of the support units,
    s. said fluid connection provides free fluid communication between each of the support units and the common pressure source once the valves have been positioned to select between retraction and extension of each support unit,
    t. at least one cylinder,
    u. a reciprocating rod within each cylinder,
    v. at least two inlets into each cylinder,
    w. one inlet is in free fluid communication with the common pressure source when fluid pressure is directed to said inlet by one of the valves,
    x. another of the inlets is in free fluid communication with the common pressure source when fluid pressure is directed to said inlet by the same valve, and
    y. said support units being capable of track-to-ground engagement when extended and track-to-ground disengagement when retracted up close to the bed frame.

11. The invention as defined in claim 10 further comprising:
    aa. said module mover having two of said track units attached to the bed frame,
    bb. said track units being positioned on the bed frame so that each track unit is parallel to the other along the length of the bed frame, and
    cc. the track units are laterally spaced so that each is positioned near an outside edge of the bed frame.

12. The invention as defined in claim 10 further comprising:
    aa. said fluid supplied is air.

* * * * *